Figure 1:
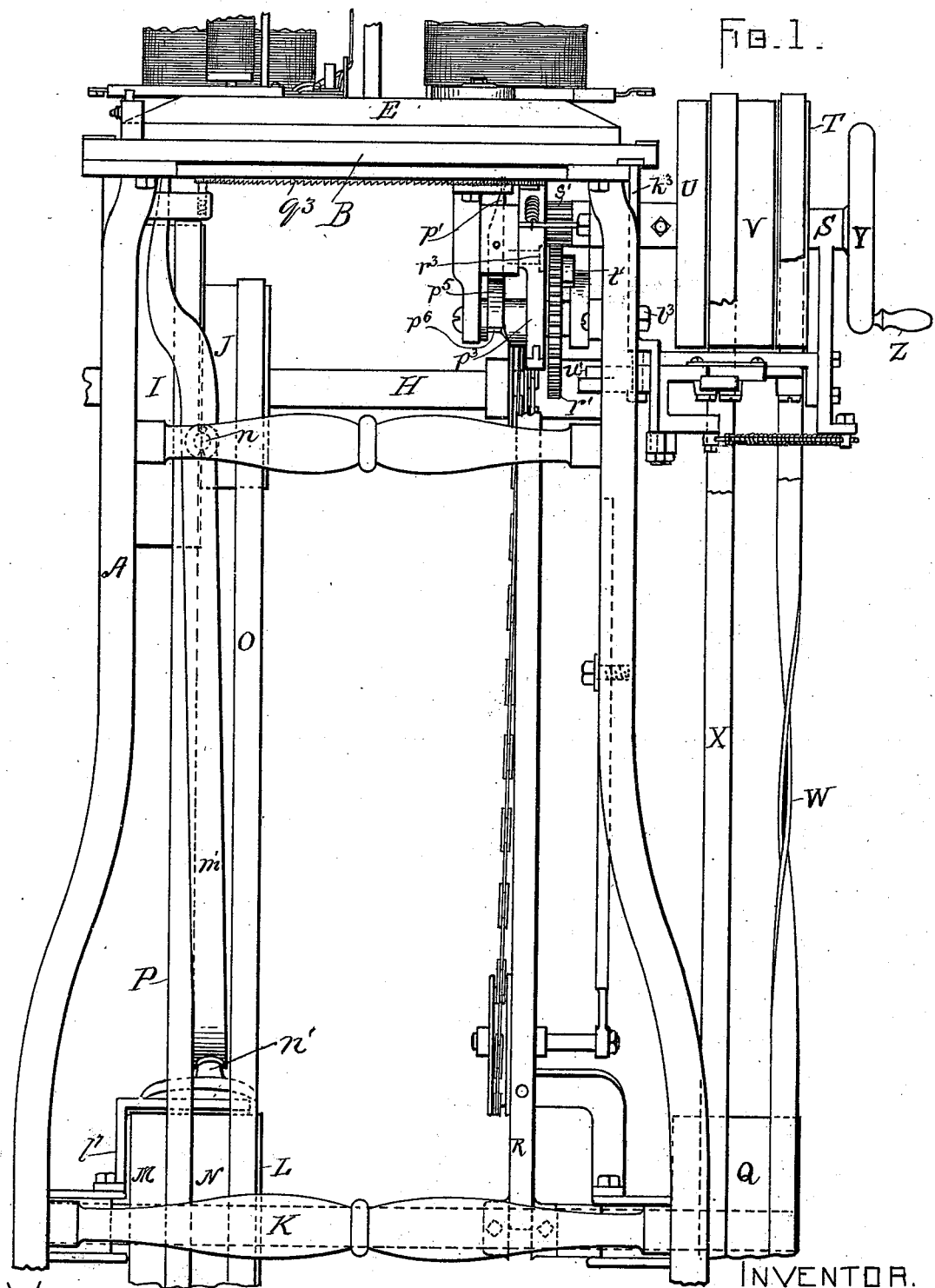

(No Model.) 9 Sheets—Sheet 1.

J. A. RICARD.
CIRCULAR KNITTING MACHINE.

No. 507,560. Patented Oct. 31, 1893.

WITNESSES:
H. A. Hall.
A. H. Abell.

INVENTOR.
J. A. Ricard
by
Wright, Brown & Crossley.
Attys.

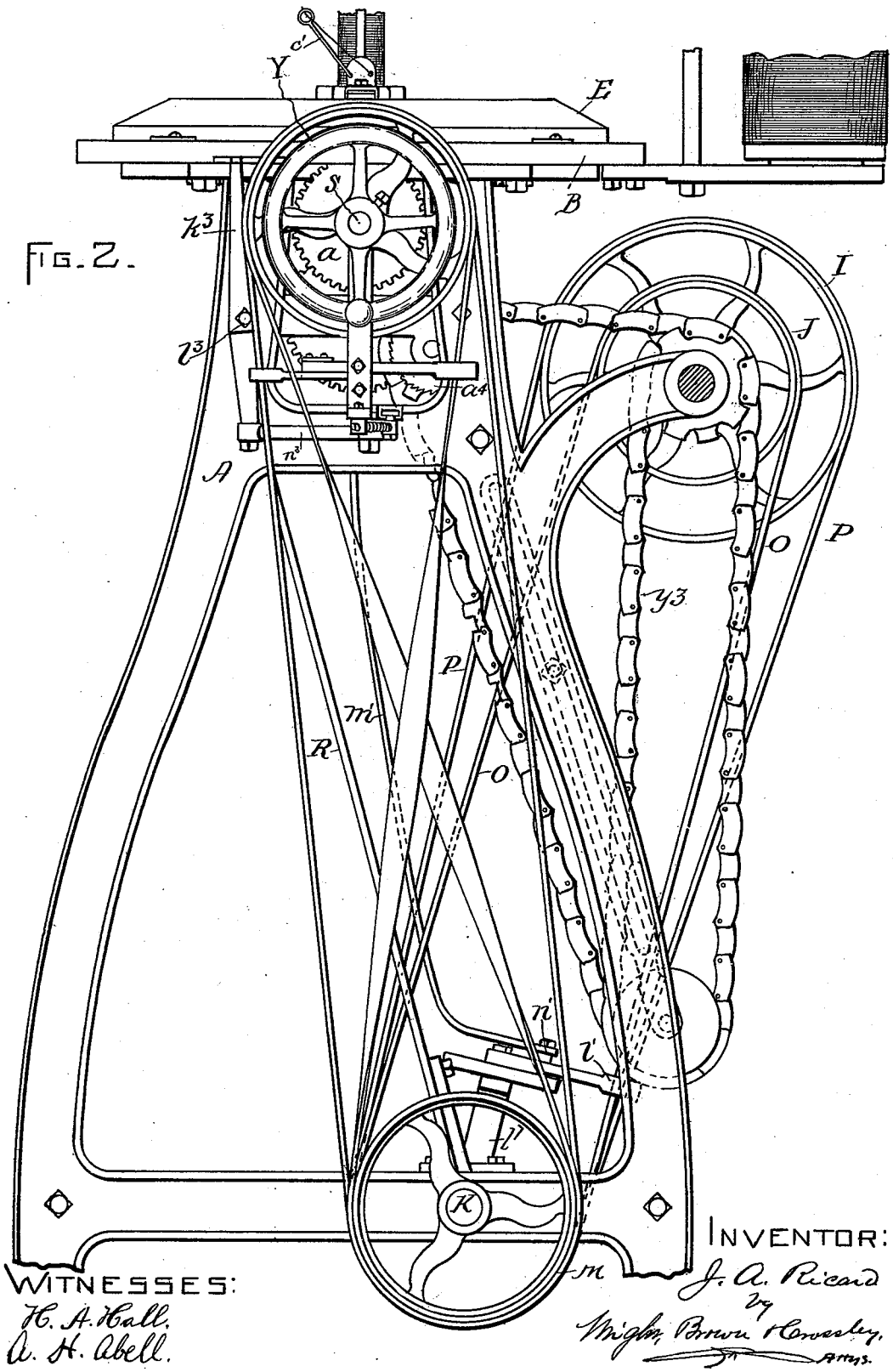

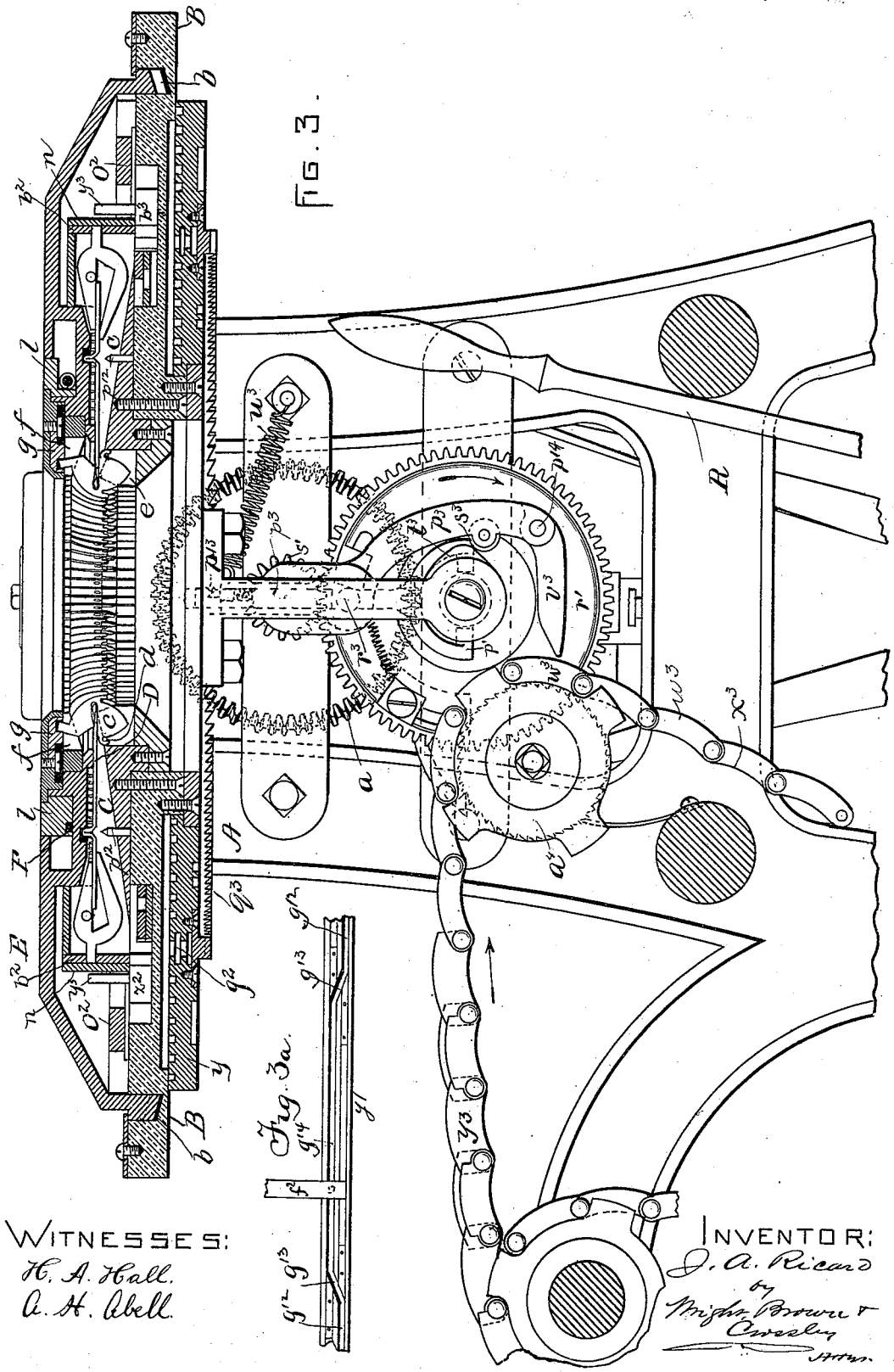

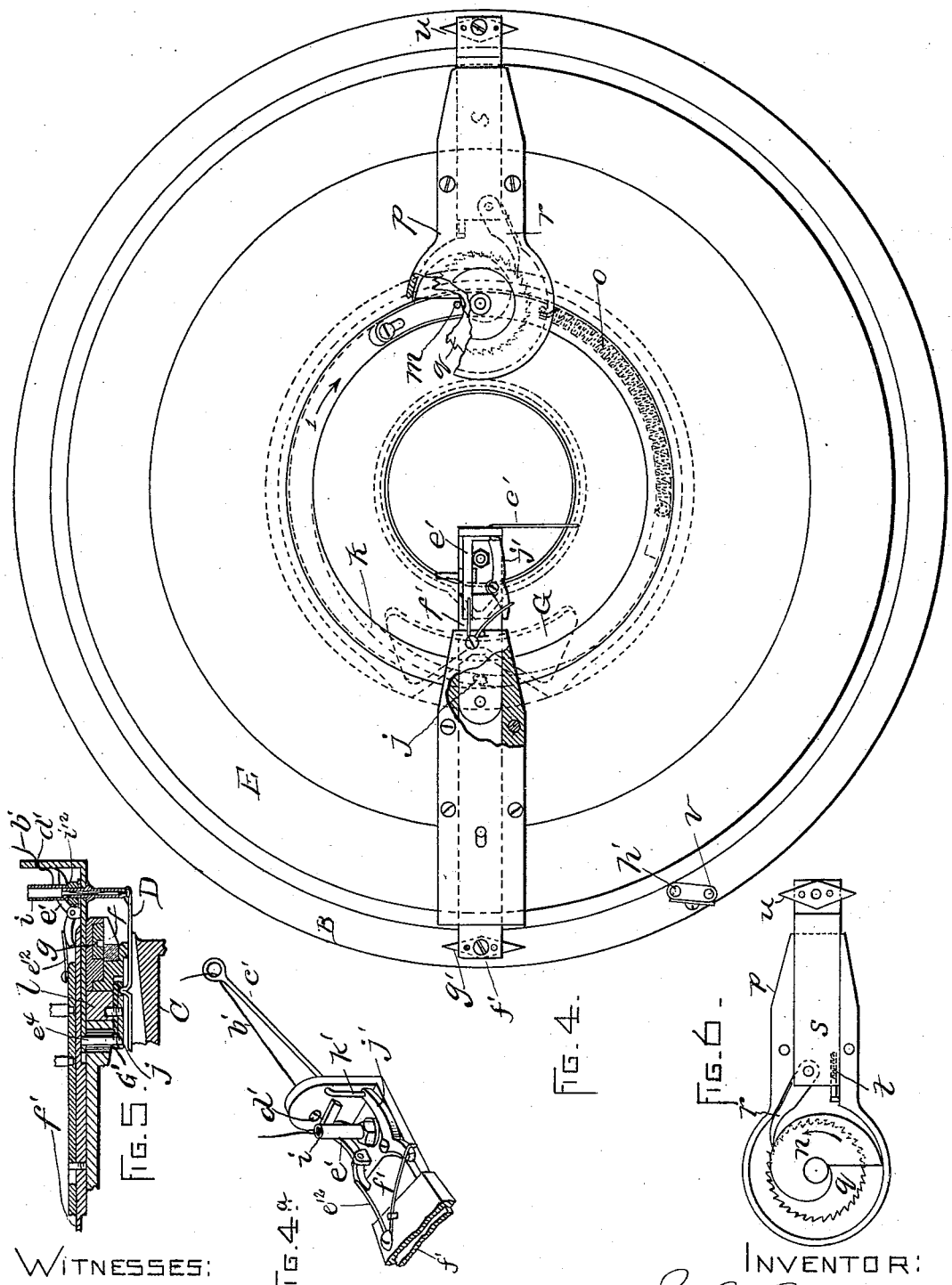

(No Model.) 9 Sheets—Sheet 5.

J. A. RICARD.
CIRCULAR KNITTING MACHINE.

No. 507,560. Patented Oct. 31, 1893.

WITNESSES:
H. A. Hall.
A. H. Abell.

INVENTOR:
J. A. Ricard
by
Wright, Brown & Crossley
Attys.

(No Model.)  9 Sheets—Sheet 6.

J. A. RICARD.
CIRCULAR KNITTING MACHINE.

No. 507,560.  Patented Oct. 31, 1893.

WITNESSES:
H. A. Hall.
A. H. Abell.

INVENTOR:
J. A. Ricard,
by Wright, Brown & Quimby
Attys.

(No Model.) 9 Sheets—Sheet 7.
J. A. RICARD.
CIRCULAR KNITTING MACHINE.
No. 507,560. Patented Oct. 31, 1893.
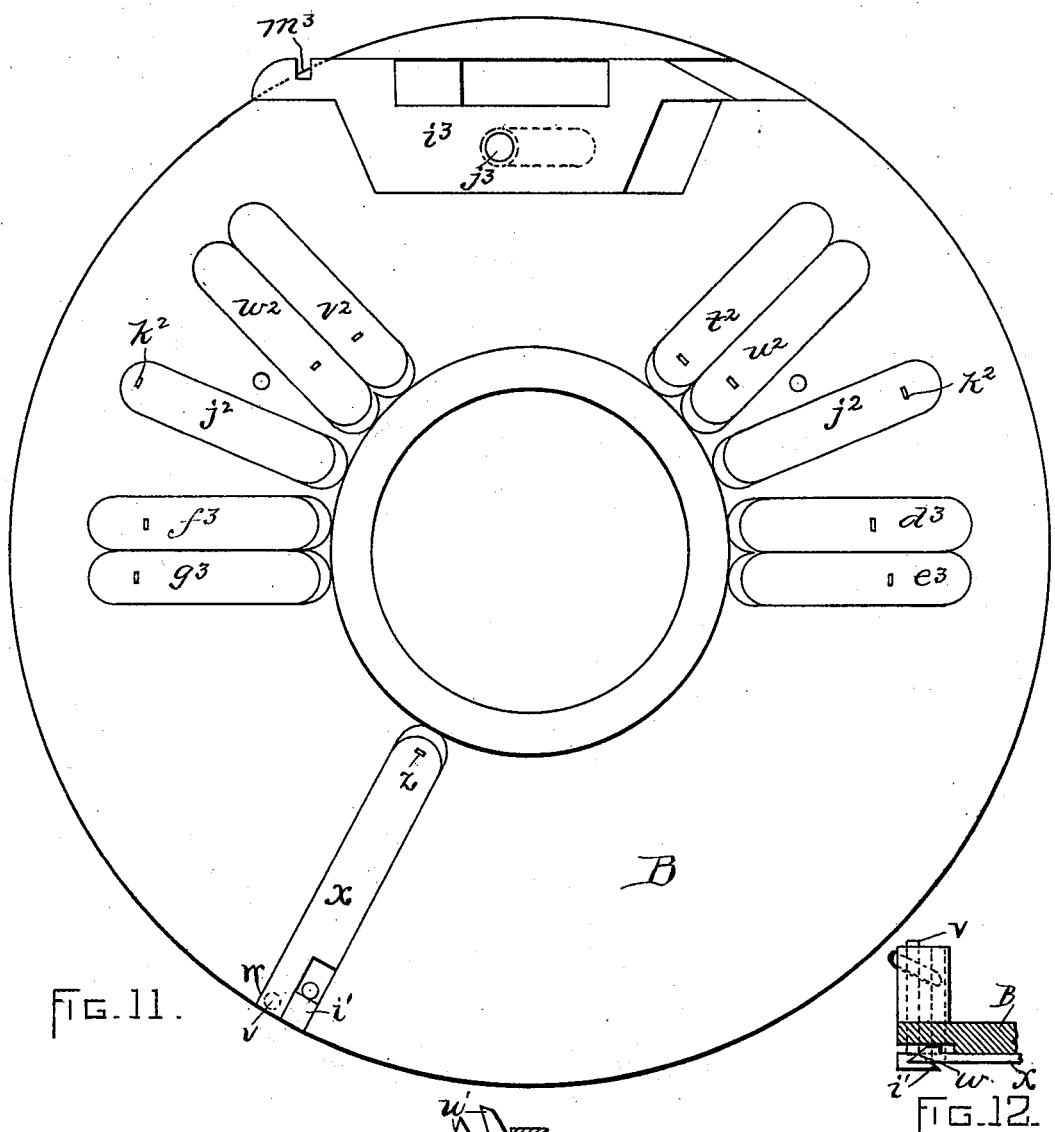
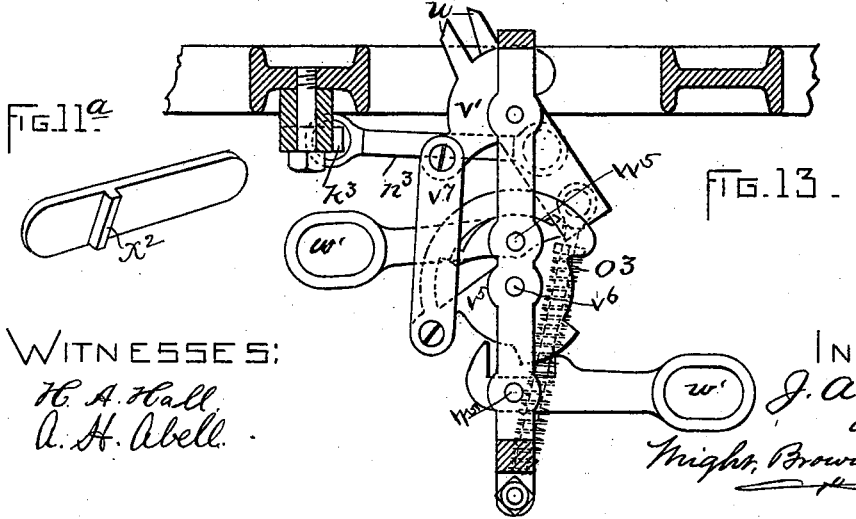
WITNESSES:
H. A. Hall
A. H. Abell
INVENTOR:
J. A. Ricard
by
Might, Brown Crossley,
Attys.

(No Model.) 9 Sheets—Sheet 8.
J. A. RICARD.
CIRCULAR KNITTING MACHINE.
No. 507,560. Patented Oct. 31, 1893.
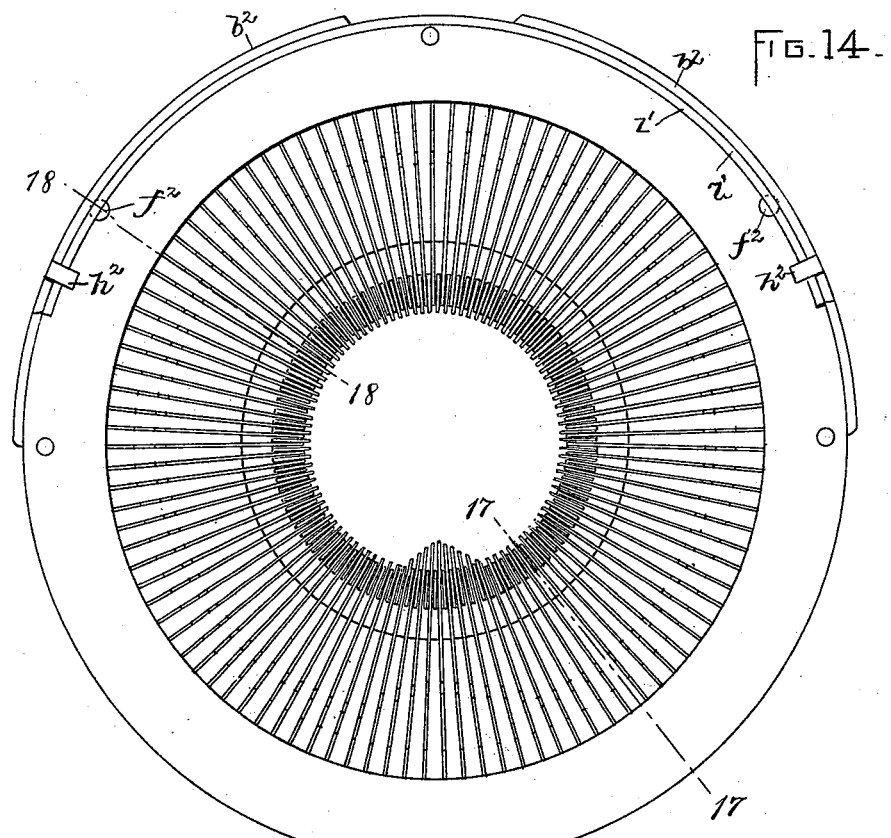
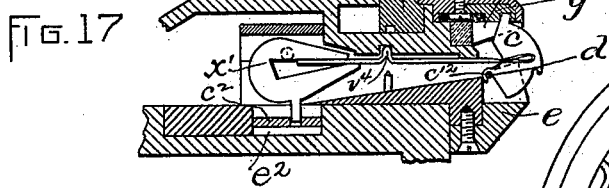
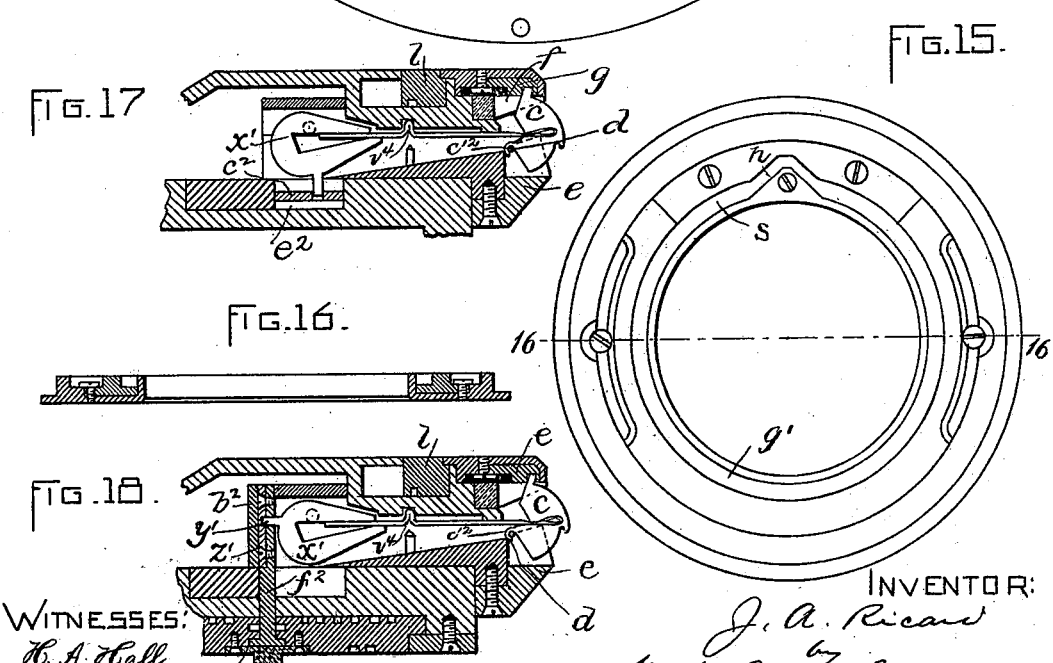
Witnesses:
H. A. Hall.
A. H. Abell.
Inventor:
J. A. Ricard
by
Wright, Brown & Quinsby.
Attys.

(No Model.) 9 Sheets—Sheet 9.
J. A. RICARD.
CIRCULAR KNITTING MACHINE.
No. 507,560. Patented Oct. 31, 1893.
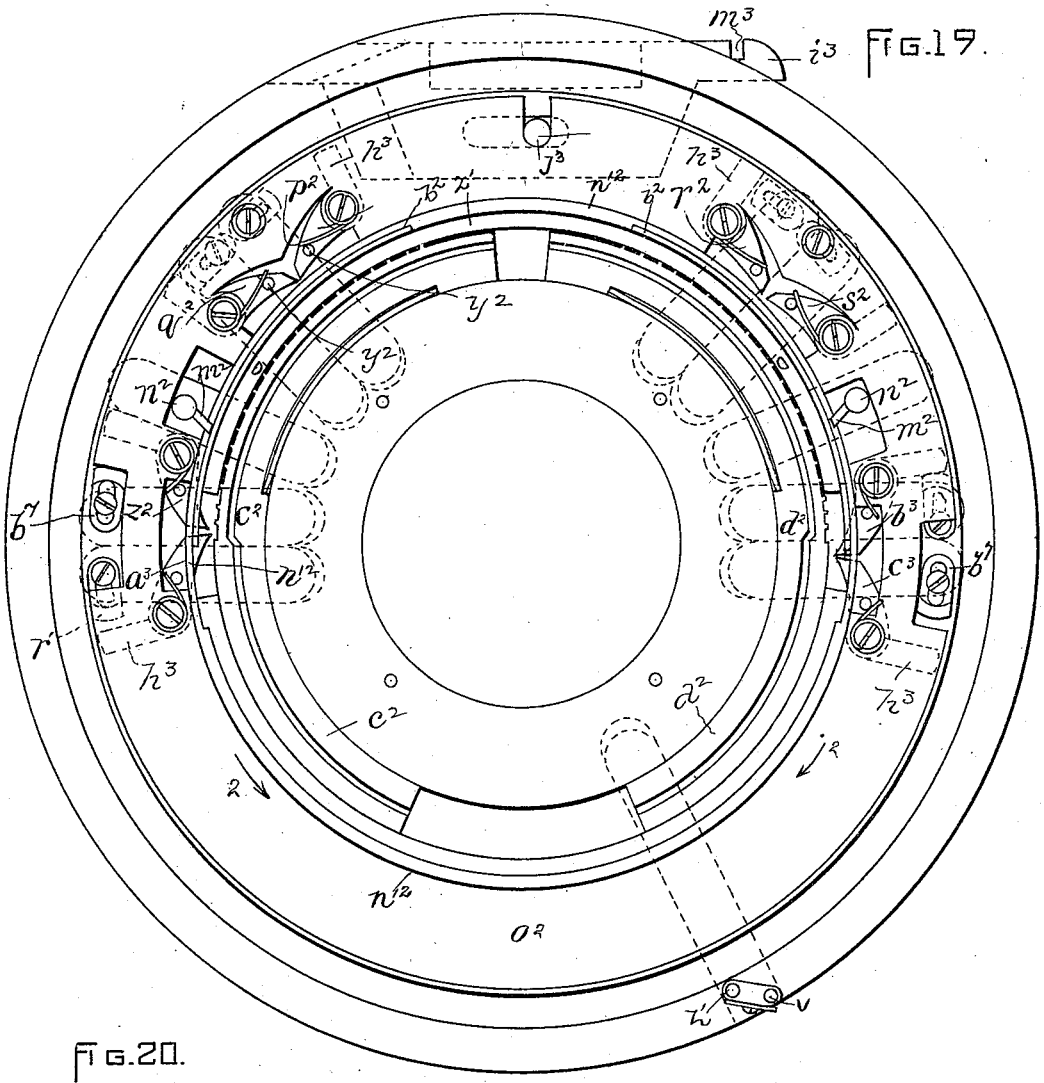
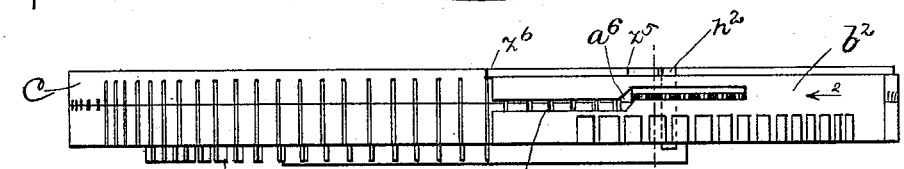
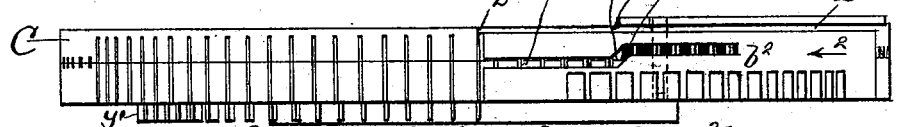
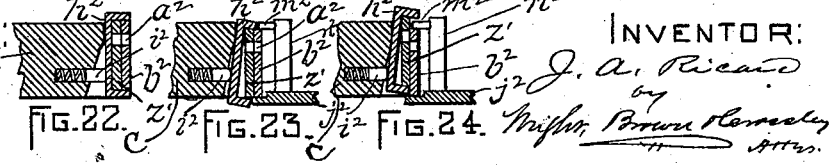
WITNESSES: H. A. Hall, A. H. Abell
INVENTOR: J. A. Ricard

UNITED STATES PATENT OFFICE.

JOSEPH A. RICARD, OF MANCHESTER, ASSIGNOR OF ONE-HALF TO THE CRANE MANUFACTURING COMPANY, OF LAKEPORT, NEW HAMPSHIRE.

CIRCULAR-KNITTING MACHINE.

SPECIFICATION forming part of Letters Patent No. 507,560, dated October 31, 1893.

Application filed April 14, 1893. Serial No. 470,317. (No model.)

*To all whom it may concern:*

Be it known that I, JOSEPH A. RICARD, of Manchester, in the county of Hillsborough and State of New Hampshire, have invented certain new and useful Improvements in Circular-Knitting Machines, of which the following is a specification.

This invention has relation to circular knitting machines so organized and equipped as to adapt them to the production of seamless stockings, entirely automatically.

It is the purpose of the invention to accomplish the following-named objects or ends: first, the provision of improved means for changing the speed at which the machine is driven so that it may be "slowed down" in the knitting of heel-and-toe work and "speeded up" when on plain circular work; second, the provision of improved means for introducing a splicing or reinforcing yarn at the heel and toe, and other points, if desired; third, the provision of improved means for varying the length of the stitch in different parts of the web; fourth, the provision of means whereby the yarn guide and stitch-cams may be moved in unison when the latter are moved to vary the length of the stitch, so that the yarn guide and latch opener usually connected therewith may maintain the same relationship to the needles at all times, and so avoid the breaking of the same; fifth, the provision of improved means for throwing a portion of the needles out of action when heel-and-toe work is to be knit; sixth, the provision of improved means for employing more than one-half of the needles in the circle in the knitting of heel-and-toe work, so that the heel especially may be knit more full and made more roomy than the round heel produced when but half of the needles in the circle are used in its production; seventh, the provision of improved means whereby the needles may be gradually retired, and in like manner brought into use in the knitting of heel-and-toe work; eighth, the provision of improved means, incidental to the foregoing, of greater or less importance, whereby the machine may be rendered automatic and be in like manner controlled throughout in the production of an article of apparel, such as a stocking or half-hose.

To the foregoing ends my invention consists of the novel parts and groups of parts which I will now proceed to describe in detail, both as to construction and function, and subsequently point out in the claims.

Reference is to be had to the annexed drawings and to the letters and figures marked thereon forming a part of this specification, the same letters designating the same parts or features as the case may be, wherever they occur.

Figure 7A:
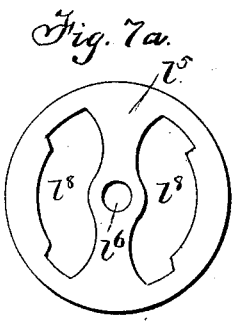
Figure 7:
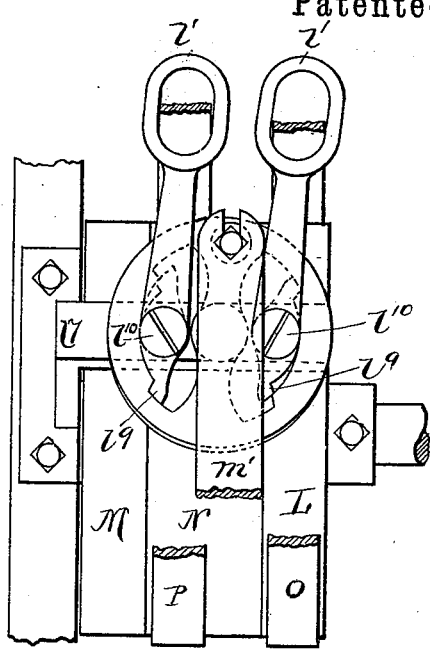
Figure 8:
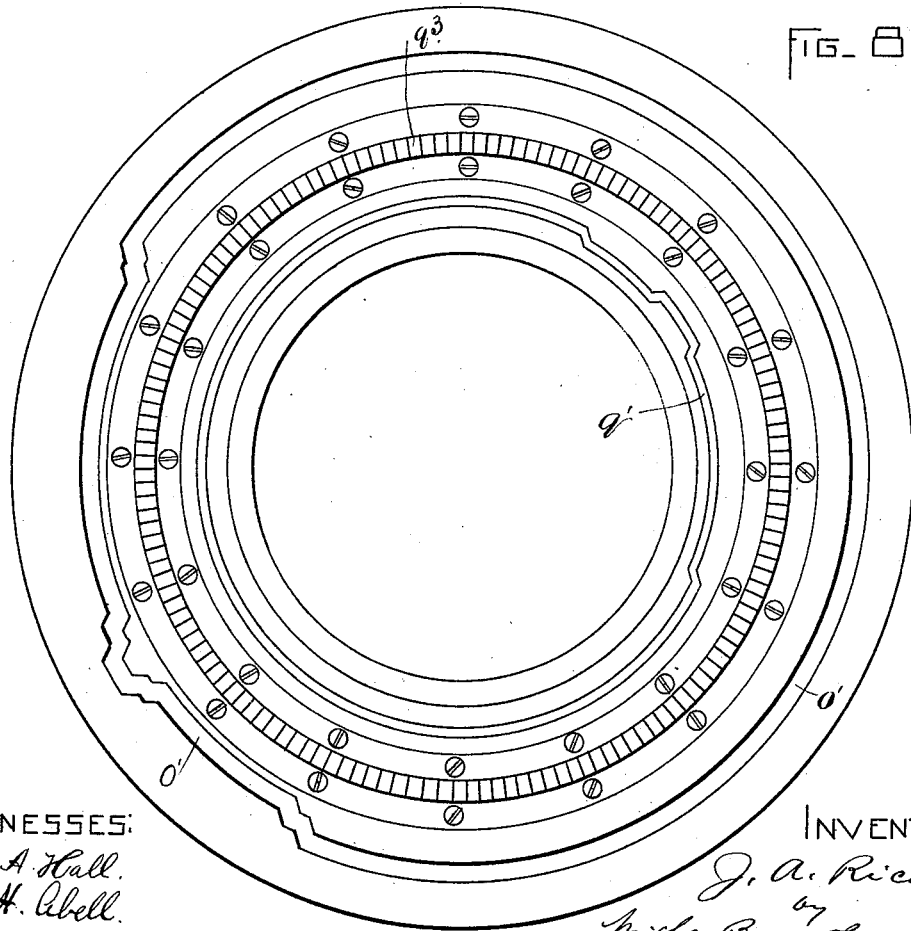
Figure 9:
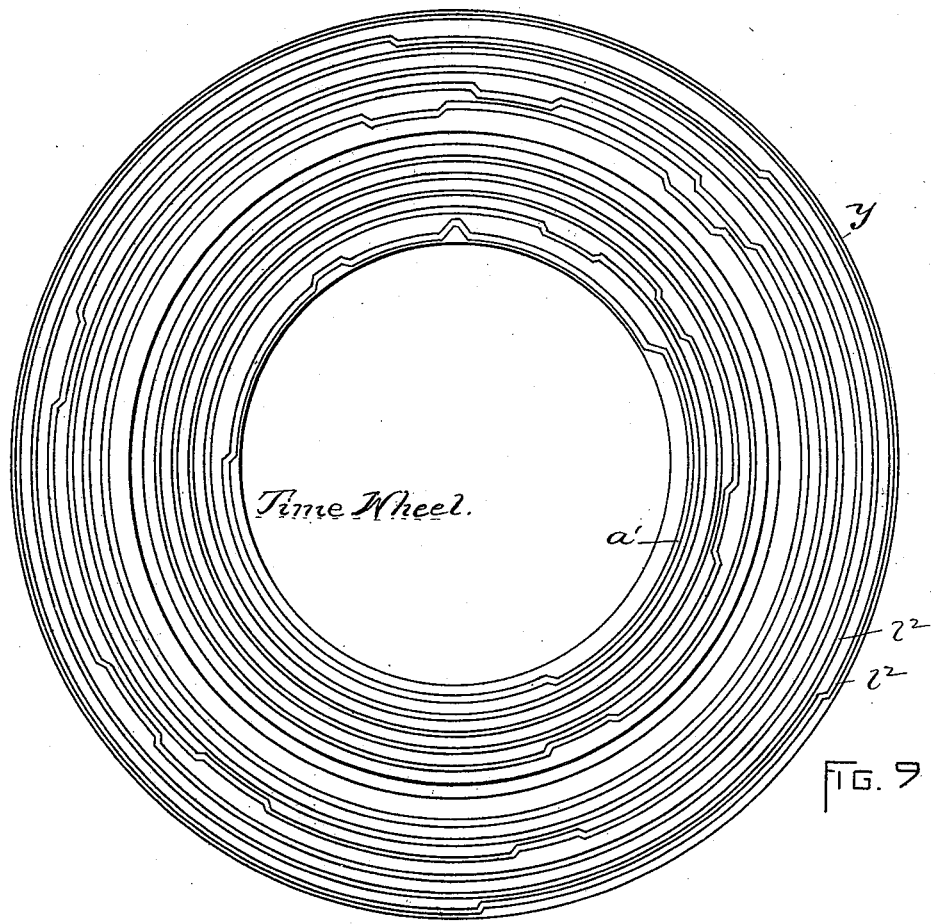
Figure 10:
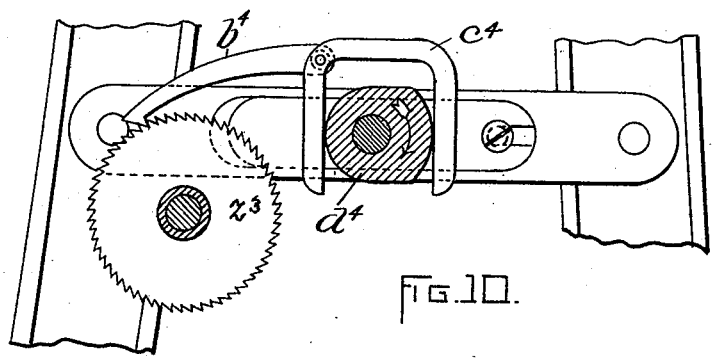

In the drawings—Figure 1 is a front elevation of the improved machine, the lower portion thereof, the upper portions of the bobbins, the take-ups, &c., being represented as broken away. Fig. 2 is a side or end elevation of the same. Fig. 3 is a vertical central sectional elevation, the section being taken on a line running from front to rear. Fig. 3ª is a development of a portion of the time-wheel to show the form of a groove formed in the body thereof, and hereinafter particularly referred to. Fig. 4, is a top plan view of the machine, parts being shown as broken away, the whole designed particularly to show the yarn controlling means and means for regulating the length of the stitches. Fig. 4ª is a detail view designed to fully illustrate some of the parts less clearly shown in Fig. 4. Fig. 5 is a vertical central sectional view through the yarn carrier and yarn-controlling means. Fig. 6 is a bottom plan view of the means for controlling the length of the stitches. Fig. 7 is a detail view of the belt shippers by which the speed of the machine is changed from fast to slow and vice versa. Fig. 7ª is a detail view hereinafter more particularly referred to. Fig. 8 is a bottom view of what I term the "time wheel." Fig. 9 is a top view of the time wheel. Fig. 10 is a detail view showing the means for actuating the pattern-chain shaft. Fig. 11 is a bottom view of the slides actuated by grooves in the time wheel, which slides control various parts of the machine, the said figure showing also the means for actuating the pawl-carrying ring. Fig. 11ª is a perspective view of one of the slides hereinafter referred to. Fig. 12 is a sectional detail view of a part of the means for actuating the means for introducing the splicing yarn and for actuating the means for varying the length of the stitches. Fig. 13 is a detail view, in plan, of the belt-shifting means for securing a reciprocation of the cam plate. Fig. 14 is a plan view of the needle-plate with the needles in place therein, and showing also some of the immediately-connected parts. Fig. 15 is a bottom view of the sinker actuating ring. Fig. 16 is a sectional view taken on the line 16, 16 of Fig. 15. Fig. 17 is a sectional view taken on the line 17, 17, of Fig. 14, with the cam plate and sinker-actuating ring in place. Fig. 18 is a view similar to Fig. 17, taken on the line 18, 18 of Fig. 14. Fig. 19 is a plan view of the machine immediately below the needle-bed. Fig. 20 is a side view of the segmental slides for actuating certain of the needle jacks, showing the position of the parts when round-and-round knitting is being performed. Fig. 21 is a view similar to Fig. 20, showing the position of the parts in readiness to commence the knitting of a heel. Fig. 22 is a sectional detail view designed to show the position of certain parts in readiness to begin the knitting of a toe. Figs. 23 and 24 are sectional detail views designed to show the position of certain parts preparatory to beginning the knitting of a heel.

In the drawings, A designates the frame of the machine which may be of any form and material suited to the purpose.

B designates the bed supporting the needle dial C, in radial grooves formed in which are arranged the needles D so that they may be reciprocated therein.

E is the cam plate or dial provided on its under side with a groove F in which the heels of the needles run.

G designates the knitting cams on the under side of the cam plate, whereby the needles are reciprocated to take the yarn and form the stitches. The said needle groove and stitch cams are indicated by dotted lines in Fig. 4.

H designates the driving shaft provided with a larger pulley I and a smaller pulley J fast upon the said shaft.

K designates the bottom shaft upon which at the left, as viewed in Fig. 1, there are loose pulleys L and M, and an intermediate tight pulley N.

O designates a belt running over the pulleys J and L, and P designates a belt passing round about the pulleys I and M. Both belts O and P are adapted to be shipped so that they may run on the tight pulley N as well as on their respective pulleys J and I.

On the opposite end of the shaft K there is a pulley Q loose upon the shaft K, and arranged to be frictionally or otherwise connected therewith by a friction or other clutch device which may be actuated by the lever R by hand to start and stop the machine.

S designates the main shaft upon which are arranged loose pulleys T and U and a tight pulley V.

W designates a crossed belt which is passed about the pulleys Q and T, and X designates a straight belt which is also passed about the pulley Q and the pulley U, the said belts W and X in addition to being passed about the pulleys T, U and Q are arranged so that they may be shifted from the pulleys T and U upon the tight pulley V.

Y designates a hand wheel provided with a crank Z whereby said wheel may be turned and the shaft S actuated to operate the machine.

On the inner end of the driving shaft S there is affixed a bevel gear $a$, which meshes with the bevel-gear teeth $b$ formed on the outer edge of the cam plate E, and actuates the same.

$c$ designates sinkers or web-holders which are hung so as to swing on a wire $d$ arranged in a groove in the sinker ring $e$, secured to the needle-bed C by means of screws or otherwise. (See Figs. 3, 17, and 18.) The sinkers are provided with shanks which extend up through slots formed in the sinker comb-ring $f$, and into a groove $g'$ formed in the sinker cam-ring $g$, in which groove in the sinker cam-ring there is an incline or cam $h$, (see Fig. 15) which swings or actuates the sinkers in proper time with the needles to effect the formation of loops and the holding down of the web, all as will be readily understood by knitting artisans without further description. The sinker comb ring $f$ is fitted loosely in the cam ring E and is kept from turning with the cam ring by the sinkers themselves.

With the parts thus far described, if the machine should be operated, and a yarn fed to the needles through the yarn guide $i$, (Figs. 4 and 5) a tubular or circular web may be produced, as for instance, in knitting the leg portion of a stocking.

In the production of the work mentioned it is desirable to gradually decrease the dimensions of the tube in the lower or ankle and foot portions by shortening the stitch in those parts, and this I accomplish by moving the stitch cams G, so that the needles may not draw as long stitches as when the upper leg portion of the web was knit. The means by which this is accomplished may be understood by reference to Figs. 4, 5, 6, 11 and 12. The stitch cams G which are made in three parts, are secured to a backing plate G' (see Fig. 5) which is adapted to slide radially to a limited extent in a guide-way formed in the lower face of the cam-plate, and is provided with a pin $j$, which extends up into an eccentric groove $k$ formed in the lower face of the ring $l$ adapted to be moved around or partially around in a circular guideway formed in the cam-plate. The said ring $l$ is provided with another pin $m$ which projects upward and is held against the face of a cam $n$ by a spring $o$ acting on the ring with a tendency to draw it in the direction indicated by the arrow 1 in Fig. 4.

The cam $n$ is supported on a bracket $p$ connected with a suitable part of the machine, and has compounded with it a ratchet wheel $q$, which is adapted to be actuated by a pawl $r$ on the inner end of a slide-bar $s$ supported and guided in the bracket $p$, the said slide-bar being pressed normally outward by a spring $t$, (Fig. 6.)

On the outer end of the slide-bar $s$ there is an incline or cam $u$, which when a pin $v$, (Fig. 4) is raised to its fullest extent will come into contact with said incline and move the bar $s$ inward actuating the ratchet $q$ and cam $n$ to the extent of one tooth of the ratchet wheel at each revolution, and so causing the ring $l$ to move around step by step in the direction contrary to the arrow 1 (Fig. 4), by reason of the pin $m$ riding up from the lowest to or toward the highest point on the cam $n$, thus carrying the stitch-cams inward toward the center of the machine and shortening the stitch. The stitch-cams will be carried inward by reason of the pin $j$ being moved inward in the eccentric groove $k$ in the ring $l$. The pin $v$ may be moved up in proper time and position by an incline or cam $w$ formed on the inner end of a slide $x$ operating in a suitable guideway between the upper face of the time-wheel $y$ and the bed B. The slide $x$ is arranged beneath the pin $v$ and is provided at its inner end with a downwardly projecting lug $z$ which extends into the inner cam-groove $a'$ of the time-wheel $y$. The said groove $a'$ is so formed, and the time-wheel is actuated in such order as to move the slide $x$ so as to raise the pin $v$ to its fullest extent and actuate the slide $s$ and attached pawl $r$ by contact with the cam or incline $u$ so that the pin $m$ will reach the highest point of the cam $n$, just as the leg of the stocking is completed and the knitting of the heel is to be commenced, when the slide will be withdrawn so as to lower pin $v$ and avoid actuating the slide $s$ until the stocking is completed.

When the leg portion of the stocking has been completed, and a heel is to be commenced, I introduce, with the regular knitting thread a reinforcing or splicing thread so as to reinforce or thicken the heel, and the means for accomplishing this will next be described, reference being particularly had to Figs. 4, 5, 11, and 12.

The regular yarn will be led from the bobbin through a proper take-up and guides to the guide $i$ of the yarn-carrier to the needles. The reinforcing yarn $b'$ may be led from its bobbin through the eye in the upper end of the take-up wire $c'$ (see Figs. 2 and $4^a$), thence down through an eye $d'$ in the yarn guide, and back of the yarn catcher $e'$, pivoted upon the yarn carrier and at its inner end adapted to act against the upturned inner end of the yarn guide. From a point $i^{12}$ below where the yarn catcher acts on the reinforcing thread the latter passes into the guide $i$ and runs with the regular yarn to the needles.

When regular round-and-round knitting is being performed the reinforcing thread will be caught and held by the yarn catcher $e'$ so as to be broken off at the needles and prevented from being fed thereto. When the knitting of the heel is begun the yarn $b'$ will be released, and fed to the needles with the regular knitting yarn, and this is accomplished as follows: On the outer end of the slide $f'$ there is an incline or cam $g'$ similar to the cam $u$ on the slide $s$, which cam is adapted to be brought into contact with a pin $h'$, when said pin is raised, and so move the slide $f'$ outward and allow the spring $e^{12}$ to depress the tail of the yarn catcher $e'$ releasing the yarn $b'$. The pin $h'$ is adapted to be raised by the incline $i'$ of the slide $x$ acting thereunder, and this it will do in proper time by the action of the cam groove $a'$ upon the lug $z$. When the slide $f'$ is moved outward to release the reinforcing yarn, a spring actuated lever $j'$ will act upon the angular inner portion $k'$ of the take-up wire $c'$, see Fig. $4^a$, and rock said take-up wire over, so as to pay out the slack held by it, and allow the reinforcing yarn to run freely to the needles.

After the heel has been completed, the pin $h'$ will be lowered, and the pin $v$ raised sufficiently high to come into contact with the outer face of the incline or cam $g'$, and move the slide $f'$ inward. The said pin $v$ will not, however, at this time be raised sufficiently high on the incline $w$ to strike the incline or cam $u$. When the slide $f'$ is moved inward its inner inclined end will pass under the outer end of the yarn-catcher $e'$ (see Fig. 5) and cause the latter to catch and hold the yarn, as before described. At the same time an incline on the outer edge of the slide $f'$ will act against the inner end of the lever $j'$ and cause it to rock the take-up wire $c'$ back drawing a little slack from the bobbin, to be given up as before in the beginning of the knitting of the reinforced toe.

In beginning to knit the heel, the machine may be "slowed down" in speed, and this is done by shifting the belts O and P so that the machine may be driven from the small pulley J on the main shaft H, it being understood that when the machine is run at high speed, it will be driven by the belt P running over the pulley I and tight pulley N, the belt O at this time running over the pulley J and loose pulley L. The belts O P may be shifted so as to make belt O the driving belt by means of the belt-shippers $l'$ (Fig. 7) connected in suitable manner with the lower end of a lever $m'$ fulcrumed at $n$ (Fig. 1), the upper end of which extends into a cam groove $o'$ formed in the lower face of the time-wheel. (See Fig. 8.) The form of the cam-groove $o'$ is such as to actuate the lever $m'$ at the proper time and to the proper extent.

$l^5$ (see Fig. $7^a$) is a disk pivotally bolted at its center, as at $l^6$ to a knee $l^7$ attached to the frame. Said disk is provided on opposite sides of its center with cam openings $l^8$ into which extend feet $l^9$ formed on the inner ends of the belt shippers $l'$ which are pivoted, as at $l^{10}$ to the knee $l^7$. The lever $m'$ is loosely pivoted at its lower end at $n'$ to the disk $l^5$, so that as the said lever $m'$ is moved on its fulcrum $n$ the disk $l^5$ will be turned on its pivot $l^6$, and the cams or inclines formed on the edges of the openings $l^8$ acting on the cam or inclined points of the feet $l^9$ will operate to move the belt shippers $l'$ on their pivots $l^{10}$, and so ship the belts controlled by said shippers from side to side.

At the same time that the lever $m'$ is moved to "slow down" the speed of the machine, a lever $p'$ (see Fig. 1), fulcrumed on the machine, and having its upper end extended into the cam groove $q'$ in the lower face of the time-wheel, (Fig. 8,) will be actuated by the form of said cam groove so as to ship the gear wheel $r'$ to the right on its shaft, as the parts are viewed in Fig. 1, it being understood that the lower end of lever $p'$ is forked as at $p^5$ which forked portion engages a groove $p^6$ formed in the hub of the gear $r'$, as is common in the construction of shipping gears. The gear wheel $r'$ may be driven by an elongated pinion $s'$ on the shaft S, the elongated character of the pinion $s'$ permitting of the shifting of the gear $r'$ without disengagement from said pinion.

The outer or right-hand face of the gear wheel $r'$ is provided with two cams $t'$ at different points and in different planes, which, as said gear wheel is rotated are adapted to come into contact with the two fingers $u'$ projecting in different planes from the free end of the lever $v'$ which is connected by suitable mechanism, so as to secure a to and fro motion of the belt shippers $w'$ (see Fig. 13), which control the positions of the belts $w$ and $x$ on the pulleys around which they are adapted to run.

As herein shown $v^5$ is a plate pivoted at $v^8$ and is connected by means of a link $v^7$ with the lever $v'$, so that as the said lever $v'$ is oscillated on its pivot the plate $v^5$ will be correspondingly oscillated. The belt shippers $w'$ are pivoted at $w^5$ and their inner ends are provided with cam points or inclines as shown adapted to be acted upon by cam points or inclines as shown formed on the plate $v^5$, so that as the latter is oscillated the belt shippers will be likewise oscillated or moved to and fro. As the gear $r'$ revolves, one of the cams $t'$ will strike a finger $u'$ with which it is adapted to come into contact moving the lever $v'$ so as to ship the belts bringing say the straight belt X on the fast pulley V and the cross belt W on its loose pulley T. This will effect the revolution of the cam-plate in one direction of its movement until the other cam $t'$ engages the other finger $u'$ of the lever $v'$ when the belts in question will be shipped in a contrary direction, the belt X being carried to its loose pulley U, and the belt W upon the fast pulley V reversing the motion of the cam-plate and in this way the cam-plate will be reciprocated as is necessary and common in the performance of heel-and-toe work.

Another thing necessary in the knitting of heel-and-toe work is the throwing out of action of a portion of the needles in the circle, and then gradually retiring the needles still in action, allowing them to hold the stitches thereon, and gradually bringing said needles again into action. This I do by the means I will next describe.

All of the needles thrown out of and brought back into action are provided with long tails which extend between the arms of pivoted jacks $x'$ which jacks are provided with heels or lugs which extend into the grooves of slides, which slides are operated so as to rock the jacks on their pivots and move the needles so as to bring their butts or heels into the path of the knitting or stitch cams G or withdraw the same therefrom. Certain of the jacks $x'$, those pertaining to the instep needles, are provided with short shanks or lugs $y'$ (Fig. 18) at their outer or rear ends, which shanks extend into a horizontal groove formed in the inner segmental slide $z'$ (see Figs. 22, 23 and 24) extending about the periphery of the needle-bed C while other of said jacks $x'$ (herein shown as six on opposite sides of the needle-bed and marked $x^{15}$), are provided with longer shanks $y'$ which extend past the ends of the slides $z'$ into grooves $a^2$ formed in slides $b^2$ adapted to be moved around slide $z'$. It will be understood that the slides $z'$ terminate at the point $z^5$ (Figs. 20 and 21), and that the slides $b^2$ overlap the slides $z'$ from $z^5$ to $z^6$ and it is into the groove $a^2$ of this overlapping portion that the long shanks of the jacks between points $z^5$ and $z^6$ extend when the slides $b^2$ are in normal position. The groove $a^2$ has a higher and a lower horizontal part, the two parts being joined by an inclined part $a^6$, as is clearly shown in Figs. 20 and 21. The slide $z'$ is adapted to be simply raised and lowered, while the slide $b^2$ is adapted to be both raised and lowered and moved longitudinally or circularly.

The ring $n^{12}$, shown in Fig. 19, on the outside of the slides is provided for the simple purpose of holding the slides in place.

Others of the jacks $x'$ (those pertaining to the usual fashioning needles) on both sides of the dial and extending from the long-shanked jacks before described, around to or nearly to a meeting point opposite the short-shanked jacks mentioned, are provided with shanks extending from their bottoms into slides $c^2$ $d^2$ which are constructed to be moved around in a groove $e^2$ formed in the bed. The said slides are shown in Figs. 3, 17, and 19, and the grooves are formed in two parts each of which extends on a circular line differing from the other, the two parts being connected by an inclined part, as is usual in slides designed to throw needles into and out of action.

The first action upon beginning the knitting of a heel will be to raise the segmental slide $z'$ in order to throw all of the instep needles whose jacks are controlled thereby out of action. The raising of the said slide $z'$ is accomplished by pins $f^2$, (see Fig. 18,) which are attached at their upper ends to said slide and extend vertically down through the bed and time-plate. The said pins $f^2$ are provided on their lower ends with heads which travel in a groove $g^2$ formed in the body of the time-wheel. The said groove is constructed in two parts or sections extending in different horizontal planes, and the two sections or parts are connected by an inclined part, so that if the heads of the pins $f^2$ should be moving in the lower part $g^{12}$ of the groove, when they reach the inclined part $g^{13}$ they will ride up into the higher part or section, $g^{14}$, see Fig. $3^a$, raising the said pins, and consequently the slide $z'$ to which they are attached, and this occurs at the commencement of the knitting of a heel.

For toe work, the slides $z'$ and $b^2$ are raised together, and to insure their movement in unison they are locked together by two clips or clasps $h^2$, one at each end of the slide $z'$, which clips extend vertically inside of the slide $z'$, each having angular horizontal parts at its upper and lower ends which extend above and below the two slides $z'$ $b^2$, (see Figs. 20, 22, 23 and 24.)

It will be understood that the slides $b^2$ are raised in unison with the slide $z'$ only in the knitting of toe work, when but half of the needles are employed, and that the raising of said slides together will actuate the jacks connected therewith so as to throw the needles controlled by said jacks, out of action. In the knitting of heel work more than half of the needles are employed, and the number above one-half (namely those whose jacks are marked $x^{15}$ in Figs. 20 and 21) are controlled in widening and narrowing by the slides $b^2$.

The operation of the slides $b^2$, $c^2$, and $d^2$, in general, is substantially like that of needle-controlling slides employed in knitting machines in the widening and narrowing processes in the production of heel and toe work. In order to trip the said clips $h^2$ which are held in normal position by spring-pressed pins $i^2$ bearing thereagainst, I provide the slides $j^2$, the lugs $k^2$ of which travel in the grooves $l^2$ of the time-wheel. The inner ends of the slides $j^2$, are constructed and arranged to move against the lower angular ends of the clips $h^2$ and press the same back against the pressure of the pins $i^2$, (see Fig. 23,) so as to release the outer slides $b^2$ from locked connection with the inner slide $z'$. At the same time, laterally projecting pins $m^2$ on the upper ends of vertical pins $n^2$ on the inner ends of the slides $j^2$ will be moved over the upper edges of the slides $b^2$, as seen in Fig. 23, and hold the latter slide against being raised.

After the foregoing operations shall have taken place, the pins $f^2$ will act to raise the slide $z'$ as before described throwing the needles controlled thereby out of action; and this will leave the needles whose jacks are controlled by the slides $b^2$ in action, so that when knitting is next undertaken, as it will be, and the cam plate is reciprocated, the said slides $b^2$ may be racked or moved step by step in the direction indicated by the arrows 2, (Figs. 19, 20, and 21,) and narrowing accomplished to the extent of the needles controlled by the slides $b^2$.

After all of the needles controlled by the slides $b^2$ shall have been retired, as in narrowing, the slides $c^2$ $d^2$ will be actuated in the direction of the arrows 2, (Fig. 19) to gradually retire the needles, or so many thereof as may be desired as are controlled by the jacks $x'$ the shanks whereof extend from their bases into the grooves of the said slides $c^2$ $d^2$. After narrowing has been effected to the desired extent, the slides $c^2$ $d^2$ will be racked or shogged back to their first-mentioned position gradually bringing the needles into action which were previously retired thereby, after which the slides $b^2$ will be racked back to their normal position, the slides $z'$ lowered, the reinforcing yarn withdrawn, and round-and-round knitting for the foot of the stocking resumed. The slides $b^2$ $b^2$, and $c^2$ $d^2$, are actuated by spring-pressed pawls pivoted upon the reciprocating pawl-carrying ring $o^2$, (Fig. 19,) the said pawls being controlled so as to engage or be disengaged from the said slides, by slides similar to the slides $j^2$, which are in turn controlled by grooves in the time-wheel acting upon lugs extended therein from the slides. A slide $b^2$ on one side of the machine is actuated by the pawls $p^2 q^2$, and the other slide $b^2$ is actuated by the pawls $r^2$ $s^2$. The first-mentioned pawls are controlled by the slides $t^2$ $u^2$, and the last-mentioned pawls by the slides $v^2$ $w^2$.

Each of the slides $t^2$, $u^2$, $v^2$, $w^2$ is provided on its upper side with a cleat or cross piece $x^2$, (see Fig. $11^a$) behind which there extends a pin $y^2$ from each pawl, so that when the slide is moved back the pawl controlled thereby will be held out of engagement with the teeth or notches formed in the needle-jack controlling slides, and when the pawl-controlling slides are moved inward by the action of the cam grooves in the time-wheel on their heels or shanks, the pawls will engage the teeth or notches of the needle-jack controlling slides. With this explanation, it will be understood, that in commencing to narrow for the heel, the pawls $p^2$ and $r^2$ are first brought into action, and as soon as they have effected the narrowing adapted to be accomplished by the slides $b^2$, said pawls will be thrown out of action, and that in completing the widening the pawls $q^2$ $s^2$ will be brought into action to rack the slides $b^2$ back to normal position.

The slides $c^2$ $d^2$ are actuated in a manner similar to that described with reference to the actuating of the slides $b^2$, the pawls $z^2$ $a^3$ actuating the slide $c^2$ and the pawls $b^3$ $c^3$ actuating the slide $d^2$. The first-mentioned pawls are controlled by the slides $d^3$ $e^3$, and the last-mentioned pawls by the slides $f^3$ $g^3$, said slides being provided with cleats $x^2$ as shown in Fig. $11^a$.

Each pawl is provided with an arm or finger $h^3$ extending radially outward from its heel, as shown by dotted lines in Fig. 19, which finger is adapted to come into contact with an adjustable block $b^7$ for each finger, on the bed plate, which blocks are adapted to trip the pawls and throw them out of engagement with the teeth of their respective slides. These means are provided in order to limit the extent to which the pawls may move their slides irrespective of the extent of throw of the pawl-carrying ring $o^2$, and so adapt the mechanism to machines of fine or coarse gage.

The pawl-carrying ring is reciprocated by the slide $i^3$ connected therewith through the medium of the pin $j^3$, and the said slide $i^3$ is actuated by the lever $k^3$ fulcrumed at $l^3$ on the frame (see Fig. 2) the upper end of the said lever extending into a notch $m^3$ formed in the edge of the slide. (See Figs. 11 and 19.) The lever $k^3$ is, in turn actuated by the lever $v'$, (Fig. 13,) through the medium of a link $n^3$ connecting the lever $v'$ with the lever $k^3$. The spring $o^3$ connected with the outer end of the lever $v'$ holds the said lever in position after it is once carried over its center, as will be understood by an inspection of the last-mentioned figure.

The time-wheel is actuated through the medium of the lever $p^3$ (Figs. 1 and 3), the upper end of which is provided with a spring-pressed pawl $p^{13}$ which engages the teeth $q^3$ on the lower face of the time-wheel. The said lever $p^3$ is fulcrumed at $r^3$ and the lower free arm is provided with a roller or bowl $s^3$ which is adapted to be actuated by a cam $t^3$ on the hub of the wheel $r'$, when the said bowl or roller is allowed to come into contact with the said cam, against which the spring $u^3$ has a tendency to hold it.

To the lower end of the lever $p^3$ there is jointed as at $p^{14}$ a laterally projecting arm $v^3$, the end of which is held up by a suitable spring in close proximity with the low links $w^3$ of the pattern chain $x^3$ and is adapted to be brought into contact with the high links $y^3$ and be moved back so that the bowl $s^3$ may not engage the cam $t^3$ to actuate the lever $p^3$. This construction and arrangement of means is provided for the purpose of economizing the extent of the time-wheel, since there are times when the time-wheel need not act, and hence it is allowed to remain stationary.

The pattern chain runs over suitable sprocket and guide wheels as shown and is actuated by a ratchet wheel $z^3$ connected or compounded with a sprocket-wheel $a^4$ over which the pattern-chain passes, the said ratchet-wheel being in turn actuated by a pawl $b^4$, (Fig. 10,) pivoted upon a yoke $c^4$ which is adapted to be actuated by a cam $d^4$, connected with the hub or upon the shaft of the wheel $r'$.

It should be remarked that when the stitch-cams G are moved inward to shorten the stitch, the yarn-guide is moved inward correspondingly through the medium of a pin $e^4$ which is connected with the stitch-cams and extends up through a slot in the cam-plate and is connected with the yarn-carrier, as seen in Fig. 5. This contrivance is very important, since it preserves the relationship of the yarn-carrier and latch-opener with respect to the needles and avoids breaking and injury to the latter.

To prevent the needles from being drawn forward by the loops thereon after they are thrown out of action, I provide pins $p^{12}$ in the needle bed below the shanks of the needles so as to engage the latter in the bight or bend of the wire whereby the shank is formed. Instead of constructing these holders $p^{12}$ in the form of pins, they may be made as a rim with a sharp upper edge extending around or part way around on the needle bed below the needles.

The form and arrangement of the time-wheel is an important feature of my invention, since by making the said device in the form of a wheel and arranging it horizontally below the needle support, I am enabled to greatly economize room, and to at the same time facilitate the operation of the devices controlled thereby. Furthermore, in the organization of my machine, substantially all of the parts whereby the needles are controlled and the widening and narrowing are effected, are inclosed between the time-wheel and cam plate so that they are not liable to become damaged or broken by contact with outside means in the operation of the machine.

By the manner in which I mount the sinkers in the sinker-ring—that is, by making their supporting heels $c^{12}$ of hook form, which is adapted to engage the holding ring $d$, I am enabled to readily withdraw and replace a sinker in case of necessity without disturbing other parts of the machine. This is an important feature of the construction, as it is usually a matter of much trouble and expense, in machines as commonly constructed, to remove or repair a broken or damaged sinker.

The needles are provided beneath their heels with an inverted V-shaped notch $v^4$, as shown, so that they may readily be caught upon and held by the pins $p^{12}$ which hold the said needles back out of action.

Having thus explained the nature of the invention and described a way of constructing and using the same, though without attempting to set forth all of the forms in which it may be made or all of the modes of its use, it is declared that what is claimed is—

1. A knitting machine comprising in its construction a needle support, needles, a rotary needle-actuating mechanism, mechanism for controlling the needles to render the same active and inoperative, and a time-wheel for controlling the mechanism for controlling the needles, said time-wheel being horizontally arranged below the needle support and having a vertically arranged axis of rotation, as set forth.

2. A knitting machine comprising in its construction a needle support, needles, a rotary needle-actuating mechanism, mechanism for controlling the needles to render the same active and inoperative, a time-wheel having its axis of rotation coincident with the rotary needle-actuating mechanism, and mechanism intermediate of the time-wheel and mechanism for controlling the needles, as set forth.

3. A knitting machine comprising in its construction a needle support, needles, a rotary needle-actuating mechanism, jacks for controlling the needles, means to actuate the jacks, a time-wheel having its axis of rotation coincident with the rotary needle-actuating mechanism, and mechanism intermediate of the time-wheel and means for actuating the jacks, as set forth.

4. A knitting machine comprising in its construction a needle support and needle actuating means, mechanism for introducing a reinforcing yarn, and a time-wheel horizontally arranged below the needle-support for controlling the mechanism for introducing the reinforcing yarn, as set forth.

5. A knitting machine comprising in its construction a needle support, needles, a rotary needle-actuating mechanism, mechanism for varying the length of the stitch produced by the needle-actuating mechanism, a time-wheel horizontally arranged below the needle support and having its axis of rotation coincident with the rotary needle-actuating mechanism, and devices intermediate of the time-wheel and stitch varying mechanism, as set forth.

6. A knitting machine comprising in its construction, a knitting mechanism, mechanism for changing the speed in the production of heel-and-toe work, and a time-wheel horizontally arranged below the knitting mechanism for controlling the mechanism for changing the speed of the machine, as set forth.

7. A knitting machine comprising in its construction a knitting mechanism, mechanism for throwing a part of the needles out of action, mechanism for narrowing and widening on the remaining needles, and a time-wheel horizontally arranged below the knitting mechanism and having its axis of rotation coincident with the rotary needle-actuating mechanism, for controlling the mechanism for throwing a part of the needles out of action and for narrowing and widening on the remaining needles, as set forth.

8. A knitting machine comprising in its construction, a needle support and needle actuating means, pivoted jacks for controlling the needles, certain of said jacks having shanks or heels at their rear ends, and certain others having shanks or heels at their bottoms, and slides for controlling the said jacks, as set forth.

9. A knitting machine comprising in its construction a needle support and needle actuating means, and pivoted jacks for controlling the needles for the purpose of effecting widening and narrowing for heel-and-toe work, certain of said jacks having heels or shanks of varying lengths, and independent slides for controlling the said jacks, as set forth.

10. A knitting machine comprising in its construction a needle support and needle actuating means, jacks for controlling the needles, a slide for throwing part of the needles out of action, independent slides for effecting the widening and narrowing of part of the needles in action, and independent slides for effecting widening and narrowing upon certain of the remaining needles, as set forth.

11. A knitting machine comprising in its construction a needle support and needle actuating means, a time-wheel horizontally arranged below the needle support, a yarn-reinforcing mechanism, and a radially movable slide intermediate of the needle support and time-wheel and actuated by the latter for controlling the yarn-reinforcing mechanism, as set forth.

12. A knitting machine comprising in its construction a needle support and needle actuating means, a time-wheel horizontally arranged below the needle support, mechanism for changing the length of the stitch, a radially movable slide intermediate of the needle support and time-wheel and actuated by the latter for controlling the stitch-changing mechanism, as set forth.

13. A knitting machine comprising in its construction a needle support and needle actuating means, a time-wheel horizontally arranged below the needle support, pivoted jacks for controlling certain of the needles, a circular slide for controlling the said jacks to throw said certain needles into and out of action, and vertically movable pins connecting the said slide with the said time-wheel for controlling the former, as set forth.

14. A knitting machine comprising in its construction a needle support and needle actuating means, a time-wheel horizontally arranged below the needle support, pivoted jacks having heels or shanks on their rear ends, circular movable slides for engaging the shanks of the said jacks, pawls for engaging and moving the said slides, and radially movable slides intermediate of the needle support and time-wheel and actuated by the latter for controlling the said pawls, as set forth.

15. A knitting machine comprising in its construction a needle support and needle actuating means, a time-wheel horizontally arranged below the needle support, pivoted jacks having heels or shanks on their bottoms, circularly movable slides for engaging the shanks of the said jacks, pawls for engaging and moving the said slides, and radially movable slides intermediate of the needle support and time-wheel and actuated by the latter, for controlling the said pawls, as set forth.

16. A knitting machine comprising in its construction a needle support and cams for actuating the needles, a yarn guide, and mechanism for moving the yarn guide and cams in unison to vary the length of the stitch, and preserve uniform relation of the yarn guide to the needles, as set forth.

17. A knitting machine comprising in its construction a needle support and needle actuating means, a time-wheel horizontally arranged below the needle support, a yarn-reinforcing mechanism, and mechanism for giving up or paying out slack in the reinforcing yarn, a radially-movable slide controlled by the said time-wheel and devices between the radially movable slide and the yarn reinforcing mechanism, for controlling the said mechanism, as set forth.

18. A knitting machine comprising in its construction a needle support and needles, a cam plate for actuating the needles, the said cam plate being adapted to have a rotary and a reciprocating movement, a time-wheel horizontally arranged below the needle support for controlling the movement of the cam plate, means for imparting to the cam-plate its rotary and reciprocating movement, and intermediate devices in virtue of which the time-wheel communicates with such means, as set forth.

19. A knitting machine comprising in its construction a needle-support, needles provided with notches $v^4$ beneath their heels, needle actuating means, jacks for moving the said needles into and out of action with the needle-actuating means, and means below the needle shanks for engaging the notches $v^4$ in the latter when thrown out of action and for holding them in the latter position, as set forth.

20. A knitting machine comprising in its construction a needle support and needle actuating means, sinkers or web holders pivoted upon the needle support, a comb-ring for maintaining the sinkers in place and guiding the same in their movements, and a sinker-actuating cam ring, as set forth.

21. A knitting machine comprising in its construction a needle support and needle-actuating means, a sinker ring secured to the needle-support, sinkers pivoted thereon, a comb-ring for guiding the sinkers in their movements, and a sinker cam ring for actuating the sinkers.

22. A knitting machine comprising in its construction a needle support, a movable cam plate provided with cams for actuating the needles, a time wheel, belt-shipping mechanism for reciprocating the cam plate, a gear wheel $r'$ provided on its sides with cams or projections for acting upon said belt-shipping means, the said gear wheel being splined upon its support to turn therewith but be movable longitudinally thereon, an elongated pinion engaging and driving the gear $r'$, and a lever engaged by the time wheel and engaging the gear $r'$ to move it longitudinally on its shaft, as set forth.

23. A knitting needle provided with a shank, and an inverted V-shaped notch below the shank, in combination with a pin $p^{12}$ to engage the said notch and hold the needle against movement, as set forth.

In testimony whereof I have signed my name to this specification, in the presence of two subscribing witnesses, this 20th day of March, A. D. 1893.

JOSEPH A. RICARD.

Witnesses:
JOHN ALDRICH,
E. M. HUNT.